(12) United States Patent
Giniger et al.

(10) Patent No.: US 8,520,670 B1
(45) Date of Patent: Aug. 27, 2013

(54) AUTOMATED OPERATION AND SECURITY SYSTEM FOR VIRTUAL PRIVATE NETWORKS

(75) Inventors: Michael L. Giniger, Groton, MA (US); Warren S. Hilton, Groton, MA (US)

(73) Assignee: RPX Corporation, San Francisco, CA (US)

( * ) Notice: Subject to any disclaimer, the term of this patent is extended or adjusted under 35 U.S.C. 154(b) by 772 days.

(21) Appl. No.: 12/206,263

(22) Filed: Sep. 8, 2008

Related U.S. Application Data

(60) Continuation of application No. 10/835,060, filed on Apr. 30, 2004, now Pat. No. 7,440,452, which is a division of application No. 09/359,570, filed on Jul. 22, 1999, now Pat. No. 6,751,729.

(60) Provisional application No. 60/094,125, filed on Jul. 24, 1998.

(51) Int. Cl.
*H04L 12/28* (2006.01)

(52) U.S. Cl.
USPC ........... 370/389; 713/156; 713/157; 713/173; 713/175; 380/30; 380/258; 380/277; 380/282

(58) Field of Classification Search
None
See application file for complete search history.

(56) References Cited

U.S. PATENT DOCUMENTS

| | | | |
|---|---|---|---|
| 5,029,206 A | 7/1991 | Marino et al. | |
| 5,248,539 A | 9/1993 | Leonardi | |
| 5,369,705 A | 11/1994 | Bird et al. | |
| 5,610,982 A * | 3/1997 | Micali | 713/157 |
| 5,654,958 A | 8/1997 | Natarajan | |
| 5,748,736 A | 5/1998 | Mittra | |
| 5,805,712 A * | 9/1998 | Davis | 713/173 |
| 5,872,849 A * | 2/1999 | Sudia | 713/175 |
| 6,085,320 A * | 7/2000 | Kaliski, Jr. | 713/168 |
| 6,092,200 A * | 7/2000 | Muniyappa et al. | 726/15 |
| 6,134,327 A * | 10/2000 | Van Oorschot | 380/30 |
| 6,173,399 B1 | 1/2001 | Gilbrech | |
| 6,185,546 B1 * | 2/2001 | Davis | 705/51 |
| 6,226,751 B1 * | 5/2001 | Arrow et al. | 726/15 |
| 6,308,266 B1 * | 10/2001 | Freeman | 713/156 |
| 6,324,525 B1 * | 11/2001 | Kramer et al. | 705/40 |
| 6,456,716 B1 * | 9/2002 | Arnold | 380/277 |
| 6,496,858 B1 * | 12/2002 | Frailong et al. | 709/221 |
| 6,751,729 B1 | 6/2004 | Giniger et al. | |
| 7,249,378 B2 | 7/2007 | Wesigner et al. | |
| 7,440,452 B1 | 10/2008 | Giniger et al. | |
| 7,644,284 B1 * | 1/2010 | Stubblebine | 713/178 |
| 2003/0070080 A1 * | 4/2003 | Rosen | 713/187 |
| 2003/0140007 A1 * | 7/2003 | Kramer et al. | 705/40 |

* cited by examiner

*Primary Examiner* — Marsha D Banks Harold
*Assistant Examiner* — Anthony Sol
(74) *Attorney, Agent, or Firm* — Howison & Arnott, L.L.P.

(57) ABSTRACT

A node device provides secure communication services over a data network, such as the Internet or another public or private packet switched network, to multiple computers that are coupled through the node device and multiple other node devices. The node device includes a network communication interface for coupling the node device to the data network. The node device includes a data storage containing cryptographic information including information that is unique to the node device. The node device also includes a tunneling communication service coupled to the network interface configured to maintaining an encrypted communication tunnel with each of multiple other node devices using the cryptographic information. For example, the encrypted communication tunnels are implemented using the IPsec or PPTP protocols. The node device includes a routing database for holding routing data and a router coupled to the tunneling communication service and to the routing database. The router can pass communication from one communication tunnel to another. A centralized server can be used to control the node devices in a centralized manner, thereby reducing or eliminating on-site administration of node devices.

1 Claim, 12 Drawing Sheets

AUTOMATED OPERATION AND SECURITY SYSTEM FOR VIRTUAL PRIVATE NETWORKS

This application is a Continuation of, and claims priority under 35 U.S.C. §120 to, U.S. patent application Ser. No. 10/835,060, filed 30 Apr. 2004, now U.S. Pat. No. 7,440,452, which is a Divisional of, and claims priority under 35 U.S.C. §120 to, U.S. application Ser. No. 09/359,570, filed 22 Jul. 1999, now U.S. Pat. No. 6,751,729, which claims priority under 35 U.S.C. §119 to U.S. Provisional Application No. 60/094,125, filed 24 Jul. 1998, the entireties of all of which are incorporated by reference herein.

BACKGROUND

1. Field of Endeavor

This invention relates to establishing and operating virtual private data networks.

2. Brief Description of the Related Art

Virtual private networks (VPNs) leverage the flexibility and cost advantages of the Internet by passing information over the Internet, or other shared Internet Protocol (IP) network, in a secure manner. VPNs enable enterprises to securely bridge geographically separated computers or local networks over the Internet as an alternative to using expensive, leased-line networks and other remote-access solutions. Internet Service Providers (ISPs), recognizing the benefits of VPNs, are beginning to offer multi-tiered VPN services to their customers.

Businesses, recognizing the benefits of VPNs, employ VPNs to support a wide variety of connectivity needs including remote dial-up access for telecommuters and mobile users, private line augmentation and replacement of existing leased-line and frame relay networks, extranet networking for secure and controlled wide area access to corporate information resources by their business partners, and segmented intranet networking for secure partitioning of internal traffic across both the wide area and the local area.

An important impetus for the adoption of VPN technology by businesses is the significant cost saving associated with the replacement of expensive remote access servers and associated long distance dial-up charges, the substitution of inexpensive and ubiquitous Internet access for expensive leased lines and frame relay access, and the introduction of a flexible, fast, secure, and inexpensive mechanism for exchanging data with suppliers and customers.

At the present time, a number of standards and proprietary schemes exist for encrypting and authenticating data packets that traverse public or private data networks. In December 1995, the Internet Engineering Task Force (IETF) published five Requests for Comments (RFCs) that define formats and methods for encrypting and authenticating Internet Protocol (IP) packets. More recently, the IETF has published a series of Internet Drafts that update the formats and methods for encrypting and authenticating IP packets. The IETF initiative is called Internet Protocol Security (IPSec).

The IETF is currently in the process of defining a data link layer security protocol that is known by the name Layer 2 Tunneling Protocol (L2TP). L2TP encapsulates data link layer PPP frames and transmits them across public data networks by prepending an IP header to the encapsulated PPP frames.

Microsoft Corporation has implemented a proprietary data link layer security protocol called Point to Point Tunneling Protocol (PPTP) that encrypts data layer PPP frames and transmits them across public data networks by prepending an IP header to the encrypted PPP frames.

The IETF has also published a series of Internet Drafts intended to address the standardization of a key management protocol by which IPSec devices negotiate their security associations and keying material. The original name for this key management scheme was called ISAKMP/OAKLEY; the more current name is the Internet Key Exchange (IKE).

SUMMARY

According to a first of numerous aspects of the invention, in general, a node device provides secure communication services over a data network, such as the Internet or another public or private packet-switched network, to multiple computers that are coupled through the node device and multiple other node devices. The node device includes a network communication interface for coupling the node device to the data network. For example, the network communication interface is an Ethernet interface that is coupled to a cable modem or a digital subscriber loop (DSL) modem or a serial interface coupled to a telephone modem for communicating with an Internet service provider. The node device is, for example, an edge device located at a customer premises or at an Internet POP, a network device located at an intermediate point in the Internet, or can be implemented in software on a computer at the customer premises. The node device includes a data storage containing cryptographic information including information that is private to the node device. The information that is private to the node device can include a private key of a public/private key pair known only to the node device, and can further include a certificate, such as a X.509 format certificate, which includes a public key of the public/private key pair. The node device also includes a tunneling communication service coupled to the network interface and is configured to maintain an encrypted communication tunnel with each of the multiple other node devices using the cryptographic information. For example, the encrypted communication tunnels are implemented using the IPsec or PPTP protocols. The node device further includes a routing database for holding routing data and a router coupled to the tunneling communication service and to the routing database. The router is configured to accept communication from a first of the computers that includes an address of a second of the computers, to select one of the other node devices based on the address of the second computer and the routing data, and to pass the communication through the encrypted communication tunnel to the selected node device.

The node device can include one or more of the following features:

The router accepts the communication from the first of the computers from the tunneling communication service after that communication is received by the tunneling communication service through one of the encrypted tunnels to the other node device.

The node device further includes a management module configured to communicate with a server over the data network, to use the information in the data storage that is private to the node device for authentication with the server, and to accept cryptographic information from the server for storing in the data storage for use by the tunneling communication service in maintaining the encrypted tunnels.

The management module is configured to receive communication policy information from the server, for example information that the node device uses to limit or prioritize communication between node devices.

The node device further includes a local communication interface, such as an Ethernet interface, coupling the node device to the first of the computers. The router accepts the communication from the first of the computers through the local communication interface.

The node device further includes a communication agent coupled to the local communication interface configured to accept a broadcast communication from the first of the computers. That broadcast communication is addressed to a multiple of other devices, for example being a message broadcast according to the BOOTP or DCHP protocol, or another type of request for configuration data from the first local computer. The communication agent is configured to forward the communication over one or more of the encrypted communication tunnels to the other node devices.

The communication agent can select one or more of the encrypted communication tunnels prior to forwarding the communication. For example, a DCHP message can be forwarded over a single tunnel to another node device to which a DCHP server is locally coupled, thereby avoiding forwarding the broadcast communication to other node devices to which DCHP servers are not connected. Selecting the tunnels can be based on configuration data provided by a management server.

The router is further configured to accept routing data over the encrypted communication tunnel from the other node devices, for example according to the RIPv2 or OSPF protocols, and to update the routing database using the accepted routing data.

Each of the encrypted communication tunnels belong to one of multiple sets of tunnels, or VPN "domains," and the router is configured to prevent forwarding of communication received from a tunnel in one domain to a tunnel in another domain.

In another aspect, in general, a node device provides secure communication services over a data network to multiple computers that are coupled through the node device and multiple other node devices. The node device includes a data storage containing cryptographic information including information that is private to the node device, a routing database for holding routing data, and a processor. The processor is programmed to implement a tunneling communication service for maintaining an encrypted communication tunnel with each of the plurality of other node devices using the cryptographic information, and to implement a router configured to accept communication from a first of the computers, the communication including an address to a second of the computers, the router being further configured to select one of the other node devices based on the address of the second computer and the routing data, and to pass the communication through the encrypted communication tunnel to the selected node device.

In another aspect, in general, the invention is software stored on a computer-readable medium for causing a programmable device, such as a node device or a general purpose computer, to provide secure communication services over a data network to multiple devices, such as node devices and general purpose computers, that are coupled to the node device through the data network. The software causes the programmable device to perform the functions of maintaining an encrypted communication tunnel with each of the plurality of other devices using the cryptographic information and routing communication, including accepting communication from a first of the multiple devices, the communication including an address to a second of the devices, to select one of the tunnels based on the address of the second device and the routing data, and to pass the communication through the selected encrypted communication tunnel to the other device.

In another aspect, in general, a communication system provides secure communication services to multiple computers coupled over a data network. The system includes multiple node devices coupled to the data network, wherein each of the computers is coupled to the data network through at least one of the node devices. The system also includes a server computer coupled to the data network. The server is used for configuring the node devices, including for sending commands to the node devices to establish secure communication tunnels with other node devices. Each node device includes a network communication interface for coupling the node device to the data network, a data storage containing cryptographic information including information that is private to the node device, a tunneling communication service coupled to the network interface configured to maintaining an encrypted communication tunnel with each of the plurality of other node devices using the cryptographic information, a routing database for holding routing data, and a router coupled to the tunneling communication service and to the routing database. The router is configured to accept communication from a first of the computers that includes an address to a second of the computers, to select one of the other node devices based on the address of the second computer and the routing data, and to pass the communication through the encrypted communication tunnel to the selected node device.

In another aspect, in general, a method provides secure communication services between multiple computers each coupled to a data network through one of multiple node devices. The method includes establishing secure communication tunnels over the data network between multiple pairs of the node devices, including accessing cryptographic information stored in the node devices and encrypting data passing between the pairs of node devices using the cryptographic information. The method also includes accepting communication from a first computer coupled to a first node device directed to a second computer coupled to a second node device, selecting a next node device based on an identification of the second local computer included in the accepted communication, passing the communication over a first of the secure communication tunnels to the next node device, and passing the communication from the next node device to the second local computer.

The method can include one or more of the following features:

The next node device can be different than the second node device to which the second computer is coupled, that is, the path to the second node device is indirect through the next node device. Passing the communication from the next node device to the second computer then includes passing the communication over a second of the secure communication tunnels from the next node device to the second node device.

The method further includes receiving routing data over the secure communication tunnels, and selecting the next node includes using the received routing data.

The method further includes accepting broadcasted communication from the first computer, for example a request for configuration data from the local computer, and forwarding the broadcast communication over one or more of the secure communication tunnels to other node devices.

Establishing the secure communication tunnels can include establishing a secure communication session with a server over the data network, including authenticating the node device by the server, and then accepting a command over the secure communication session from the server to establish a secure communication tunnel with another of the node devices. After accepting the command from the server, the method includes establishing a secure communication tunnel with the other of the node devices.

The method can further include generating the cryptographic information, including generating a public key and a private key for the node in the node device, storing the private key in a protected storage in the node device, and providing the generated public key for the node device to the server. Authenticating the node device by the server then includes encoding a message using the stored private key at the node device, sending the encoded message to the server, and decoding the message using the public key for the node device that was provided to the server.

In another aspect, in general, a method for configures and authenticates a node device. The method includes the following steps: At a manufacturing facility, (a) generating a public key and a private key in the node device, (b) providing the public key to the manufacturing facility, and (c) storing the private key in a protected non-volatile storage in the node device. The node device is then deployed, including coupling the node device to a data network at a remote site, such as at a customer premises. At the remote site, the method then includes (d) accessing the stored private key, and (e) processing a message, for example generating a digital signature for the message, using the private key and sending the processed message over the data network to a server coupled to the data network. At the server, the method includes (f) receiving the processed message from the deployed node device, and (g) authenticating the node device including processing the received message using the public key that was generated in the device.

The method for configuring and authenticating a node device can further include, at the manufacturing facility, (b1) creating an authentication chain, including generating a certificate, for instance a standard X.509 format certificate, signed with a private key associated with the manufacturing facility and including the public key provided by the node device to the manufacturing facility. The authentication chain may also include a root public key, a root certification, or a chain of certificates, that are used to authenticate the node device. The method then further includes (b2) providing the authentication chain to the node device, and (b3) storing the authentication chain in a non-volatile storage in the node device. Then, at the remote site, the method can further include (e1) sending the authentication chain to the server over the data network.

The method for configuring and authenticating a node device can further include, prior to sending the authentication chain to the server, accepting an identification for the server and an address on the data network of the server to which the authentication chain is sent.

The method can also include receiving a certificate from the server, and authenticating the server using the accepted certificate and the accepted identification of the server.

The method can also include, at the manufacturing facility, providing an identifier of the node device to the manufacturing facility, wherein the generated certificate includes the identifier. Authenticating the node device then includes accessing said identifier provided in the certificate.

The method for configuring and authenticating a node device can further include, at the server, (h) after authenticating the node device, sending a response to the node device that includes a challenge message, and, at the node device, (i) receiving the response that includes the challenge message, processing the challenge message using the stored private key, and sending the processed challenge message to the server, thereby allowing the server to determine that the sender of the processed challenge message has the private key of the node device.

The invention includes one or more of the following advantages:

Automated installation, configuration, operation, and management of VPNs requires little or no manual configuration or on-site maintenance.

Dynamic connectivity of computers through a mesh topology VPN network permits content packets to be easily and efficiently re-routed through mesh-topology, depending on the application requirements of the user's organization. VPN devices can incorporate the necessary intelligence to optimize network bandwidth by integrating dynamic routing with VPN technology. VPN-based networks can also automatically adapt to changes in network topology.

The communication system provides comprehensive security to guarantee the safe transmission of mission-critical data over public networks. In addition to the secure encryption and authentication of content, the protocols and processes used to manage node devices from a central server are also secure. The control information exchanged between management server(s) and VPN devices is securely authenticated, encrypted, and protected from replay and other spoofing attacks.

The centralized management functionality results in simplicity of VPN setup and maintenance. For example, all security policy information, key parameters (such as type, strength, rollover times) and connectivity information are maintained in a central management system. This permits a network manager to handle operations from a single control point and it relieves branch offices and users from employing on-site technicians or administrators.

Dynamic routing enables the creation of meshed VPN network topologies. The optimum path is automatically selected based on security policy, setup connections, and routing parameters to optimize bandwidth, save time, and reduce operating costs. On a larger scale, users can form communities of interest by creating their own virtual networks within existing enterprise topologies using private or public networks. Dynamic VPN switches can handle thousands of simultaneous active users, and can interconnect with hundreds of other dynamic VPN switches.

Using multiple sets of tunnels, or domains, between which the routers in the node devices do not forward communication, the different domains can form "communities of interest" within a larger domain. For instance, different divisions in a corporation may have different domains within a corporate network. Access to a domain occurs at the first node device that accepts communication from a computer that is authorized to communicate with that domain. When communication is sent from node to node, the content of the communication does not have to be reexamined at each node to determine whether it should be forwarded to particular computers, since that communication is already associated with a particular domain based on the tunnel it arrived on. This avoids an expensive step of filtering packets multiple times as they pass from source to destination, thereby providing higher data rates as compared to a distributed filtering approach.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

FIG. 5A is a diagram which illustrates relationships between certificates at an edge device, a management server, manufacturing systems, and a root manufacturing authority;

FIG. 5B is a block diagram which illustrates storage and processing modules of a root manufacturer system and an edge device, which are used to configure the edge device;

FIG. 5C is a flowchart of a manufacture-time configuration procedure;

FIG. 9A is a block diagram in which a customer premises is linked to the Internet through multiple edge devices; and FIG. 9B is a block diagram in which an edge device is located and an Internet POP.

DETAILED DESCRIPTION OF EXEMPLARY EMBODIMENTS

Figure 1:
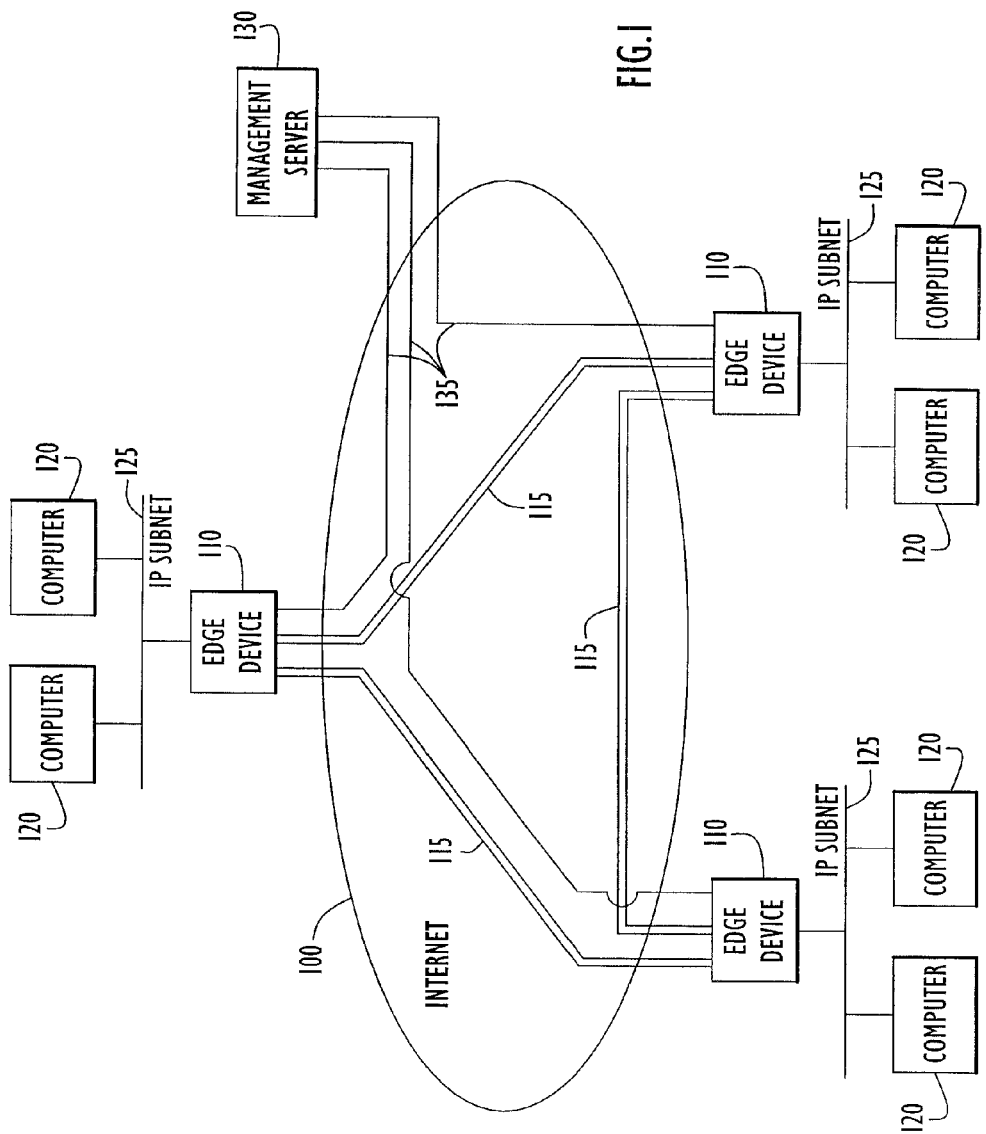
FIG. 1 is a block diagram which illustrates a first exemplary VPN in which edge devices couple a number of IP subnetworks over the Internet.

Referring to the drawing figures, like reference numerals designate identical or corresponding elements throughout the several figures.

Referring to FIG. 1, a first exemplary virtual private network (VPN), which is configured and operated according to a first embodiment of the invention, couples three Internet Protocol (IP) subnetworks 125 over Internet 100. A separate edge device 110 couples each of subnetworks 125 to Internet 100. Each edge device 110 maintains a secure communication tunnel 115 with generally one or more other edge devices 110 over which the edge devices securely transfer communication. In this first embodiment, tunnels 115 are based on IPSec security associations between edge devices 110 and allow traffic to pass between the edge devices as if that traffic were passed over a private communication link joining the edge device. Tunnels 115 together function as a virtual network in which each link which is implemented using a tunnel makes use of IP layer network services to deliver information across the Internet. Other embodiments alternatively use tunneling approaches such as those based on the PPTP or L2TP protocols. In the example shown in FIG. 1, each edge device 110 maintains a tunnel 115 with both other edge devices 110 in a fully connected mesh arrangement.

When an edge device 110 receives communication destined for a computer on subnetwork 125 that is directly coupled to it, for example receiving the communication over one of tunnels 115 connected to it, it passes that communication over the subnetwork to that destination computer.

When an edge device 125 receives communication that is destined for a computer 120 that is on the virtual private network, but that is on a subnetwork 125 coupled to another edge device 110, it selects one of tunnels 115 that are coupled to it, and passes the communication through the tunnel to its destination. Note that such communication destined for another subnetwork may originate at a computer 120 on subnetwork 125 that is coupled to the edge device 110. However, the communication may also be accepted through a tunnel 115 and routed by edge device 110 out another of tunnels 115. In this example, if the tunnel 115 that connects two of the edge devices 110 is blocked, for example due to network congestion or some other problem, the two edge devices 110 remain connected by routing packets via the third edge device 110.

In alternative embodiments, Internet 100 can be another public or private packet-switched data network, which allows access to users who are not authorized to access the VPN. In the case of the Internet 100, a wide class of users has access to the communication links which carry communication for the Internet, and generally includes users who are not authorized to access the VPN. In the case of a private packet-switched network, although the general public may not have access to the network, there may nevertheless be a subclass of users who are specially authorized to access a partitioned VPN with the private network. Also, although the description below is in terms of subnetworks 125 passing Internet Protocol (IP) communication over the VPN, subnetworks based on other protocols, such as IPX, can alternatively be coupled by similarly functioning edge devices 110.

In this first embodiment, edge devices 110 use the Internet Protocol Security (IPSec) protocol to implement the secure communication tunnels 115 between one another. Alternative tunneling protocols, such as PPTP and L2TP, are used in other embodiments.

Each edge device 110 securely communicates with a management server 130. Management server 130 is responsible for directing edge devices 110 to establish tunnels 115 among one another, and otherwise controlling their operation. This control includes authenticating the edge devices, and providing information to the edge devices that the edge devices use to establish particular secure communication tunnels 115. For example, management server 130 provides session keys to the edge devices for use in encrypting communication passing through particular tunnels. In this way, management server 130 can limit which edge devices 110 can enter into a VPN, and in particular, can prevent edge devices 110 that it cannot authenticate from entering the VPN.

The approach to management of edge devices 110 is such that as little as possible, if any, decentralized configuration of the edge devices is necessary. For instance, each edge device 110 is manufactured to include information necessary to establish a secure and authenticated a communication link 135 with management server 130 when it initially starts up. Having established communication link 135 with management server 130, an edge device 110 receives additional configuration information directly from management server 130.

Each edge device 110 maintains routing information in a decentralized manner, for example by receiving routing information over tunnels 115 from other edge devices 110. In the example shown in FIG. 1, each edge device 115 has computers 120 coupled to it that have addresses in a single logical subnet, that is, the addresses of computers 120 coupled to the edge device are all in a range of addresses defined by an IP subnetwork mask unique to that edge device. An edge device 115 sends routing information to other edge devices 115 that identifies the subnetwork so that the other edge devices can determine whether to send packets addressed to particular computers based on the address ranges handled by each edge device. In this way, the edge devices do not necessarily have to exchange routing information related to individual computers. Each edge device 115 keeps track of which subnetworks are accessible though each of tunnels 115 coupled to it, and routing costs for sending communication to those subnetworks through each of the tunnels.

Host addresses can optionally be assigned to computers by the management server or by a DCHP server in such a way that an edge device 110 (or a network device 820 described below with reference to FIG. 8) can aggregate the addresses for multiple computers or subnetworks for which the edge device provides access to the VPN into a single subnetwork. In this way, it exchanges routing information with other node devices indicating that it provides a route to any computer in the aggregated subnetwork. Routing information for small subnetworks or individual computers does not have to be sent separately by the edge device to other edge devices. Also, by aggregating the addresses into a subnetwork, the routing information needed by other edge devices does not changes often, only needing to be updated if the aggregated subnetwork address (or aggregated subnetwork mask) changes.

Alternatively, or optionally for some computers, edge devices 115 exchange host routing information. In one alternative, a common address range is used for all the subnetworks, and routing information that identifies which edge device 115 services each computer 120 is exchanged.

In alternative embodiments, or optionally in conjunction with decentralized exchange of routing information, routing information can be assembled and distributed to edge devices 110 by management server 130.

Figure 2:
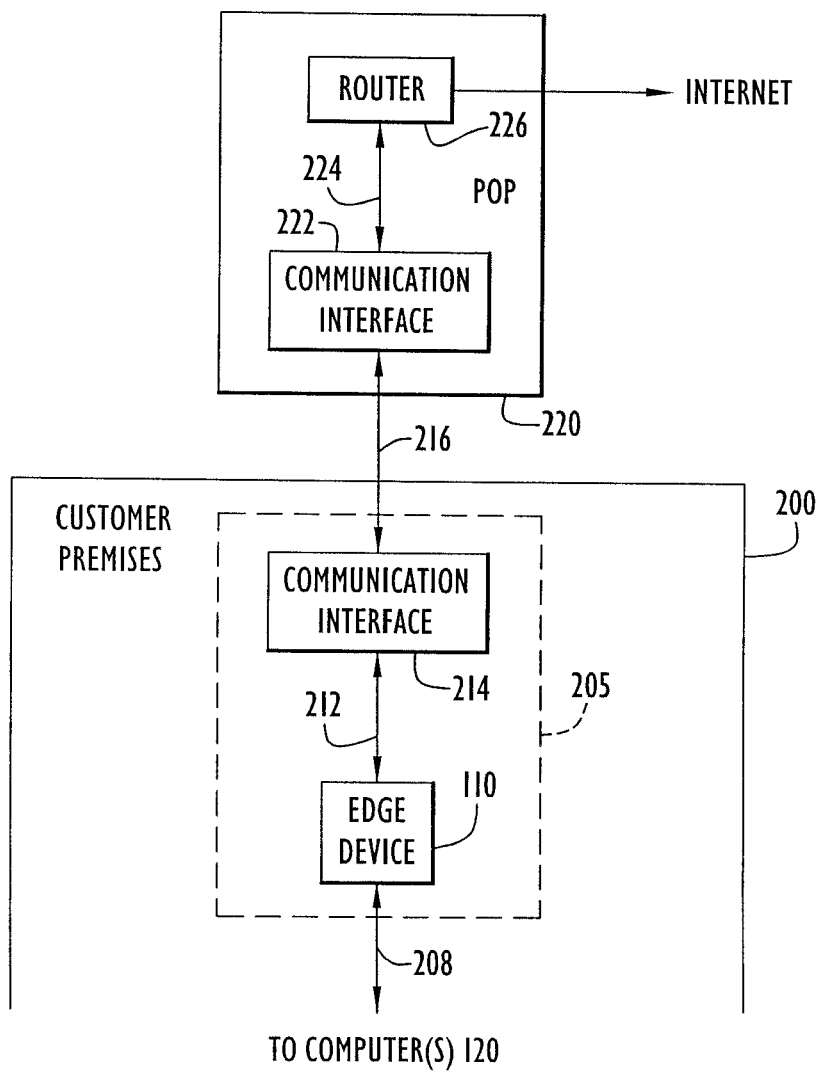
FIG. 2 is a block diagram which shows a physical connection of an edge device over a communication link to the Internet.

Referring to FIG. 2, edge device 110 and computers 120 coupled to it over its associated subnetwork 125 are located at a customer premises 200. An Internet Point-of-Presence (POP) 220 provides an access point for communication between edge device 110 and Internet 100. In particular, customer premises 220 are coupled to POP 220 by a communication link 216. In this first example, communication link 216 is a dedicated communication link, such as a T-1 or T-3 digital service leased from a telephone carrier. Edge device 110 is connected to computers 120 over a local area network link 208, such as an Ethernet link which forms part of subnetwork 125. A communication interface, such as a DSU/CSU, couples edge device 110 to communication link 216. At POP 220, a corresponding communication interface 222 is also coupled to communication link 216 and communication interface 222 is coupled to a router 226, which provides a communication interface with Internet 110. Communication links 212, 214, and 224, which pass communication between edge device 110 and router 226 in general carry communication for multiple tunnels 115, communication between edge device 110 and management server 130, and other IP-based communication to computers and other devices coupled to it over Internet 100. That is, referring back to FIG. 1, individual tunnels 115 and communication links 135 are all carried over a common physical communication link 216 (FIG. 2).

Figure 9A:
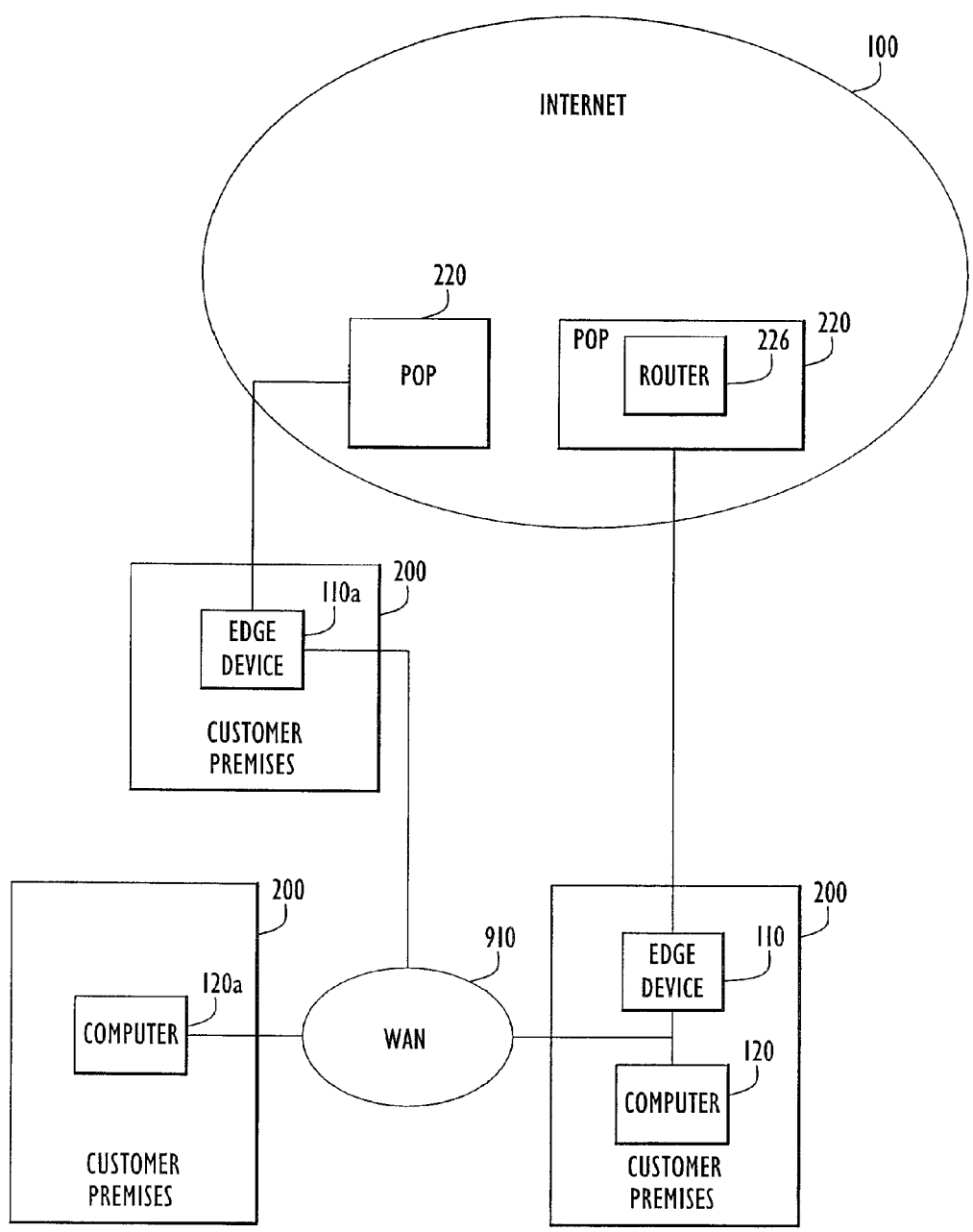
FIGS. 9A-B are block diagrams of alternative arrangements of edge devices.

Referring to FIG. 9A, in alternative embodiments, computers at a number of separate customer premises 200 can be coupled to Internet 100 through an edge device 110. In FIG. 9A, a computer 120A is coupled over a private wide area network (WAN) 910 to a second edge device 110A at another customer premises 200. Optionally, WAN 910 may be coupled to Internet 100 through multiple edge devices, for example both edge device 110 and edge device 110A at another customer premises, thereby providing multiple redundant routes from Internet 100 to computers 120 coupled to WAN 910.

Figure 9B:
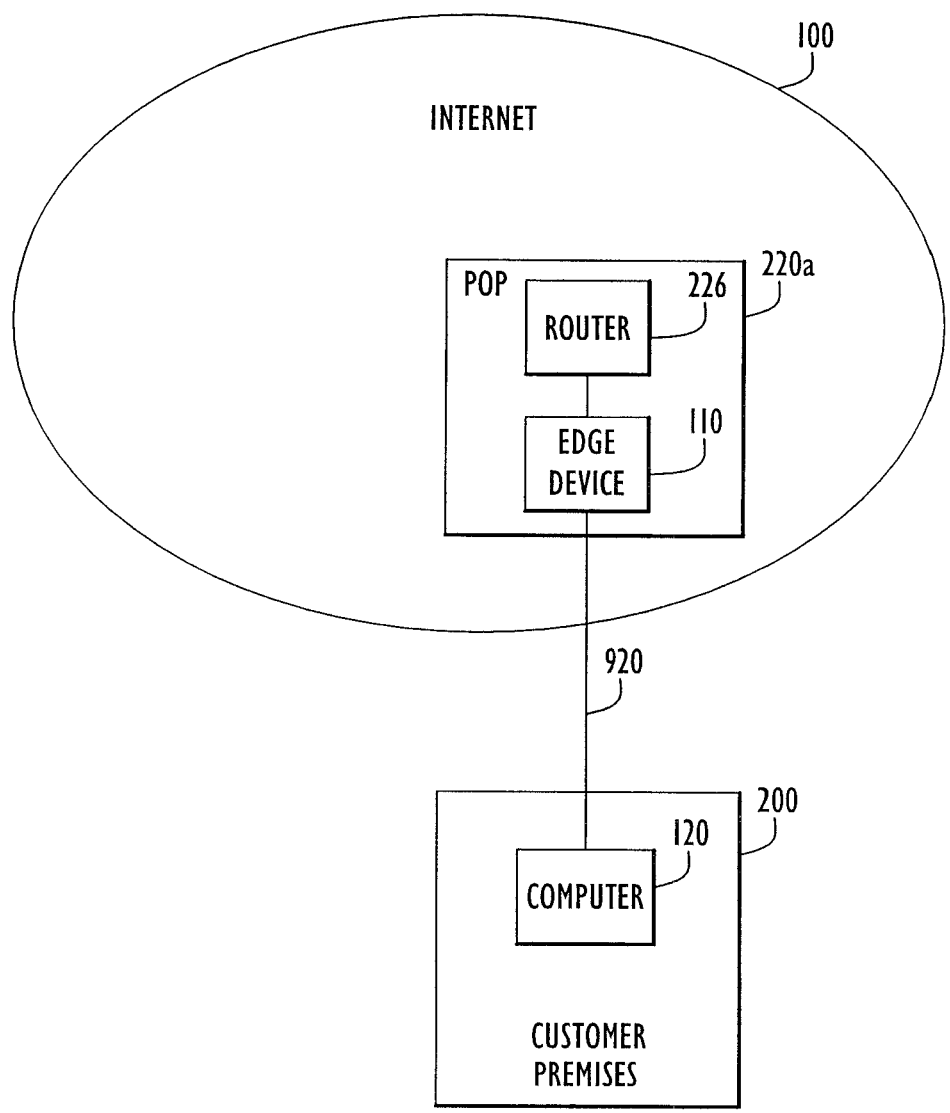

Referring to FIG. 9B, edge device 110 is alternatively not necessarily located at customer premises 200, but is rather at POP 220A. In this case, a private communication link 920, such as a leased telephone line, couples customer premises 200 and edge device 110 at POP 220, thereby maintaining the privacy of the VPN. Multiple customer premises 200 can optionally be coupled to a single edge device 110 in this manner.

In various alternative embodiments, different types of communication links 216 are used. For instance, communication link 216 can be part of a broadband cable system such as a cable television system, communication interface 214 is a cable modem and communication interface 222 is a head-end cable interface that communicates with multiple cable modems. Similarly, communication link 216 can be part of a telephone network and communication interface 214 is an Asynchronous Digital Subscriber Loop (ADSL) modem. Alternatively, communication link 216 is a dial-up analog or ISDN telephone connection, and communication interfaces 214 and 222 are modems.

Figure 3:
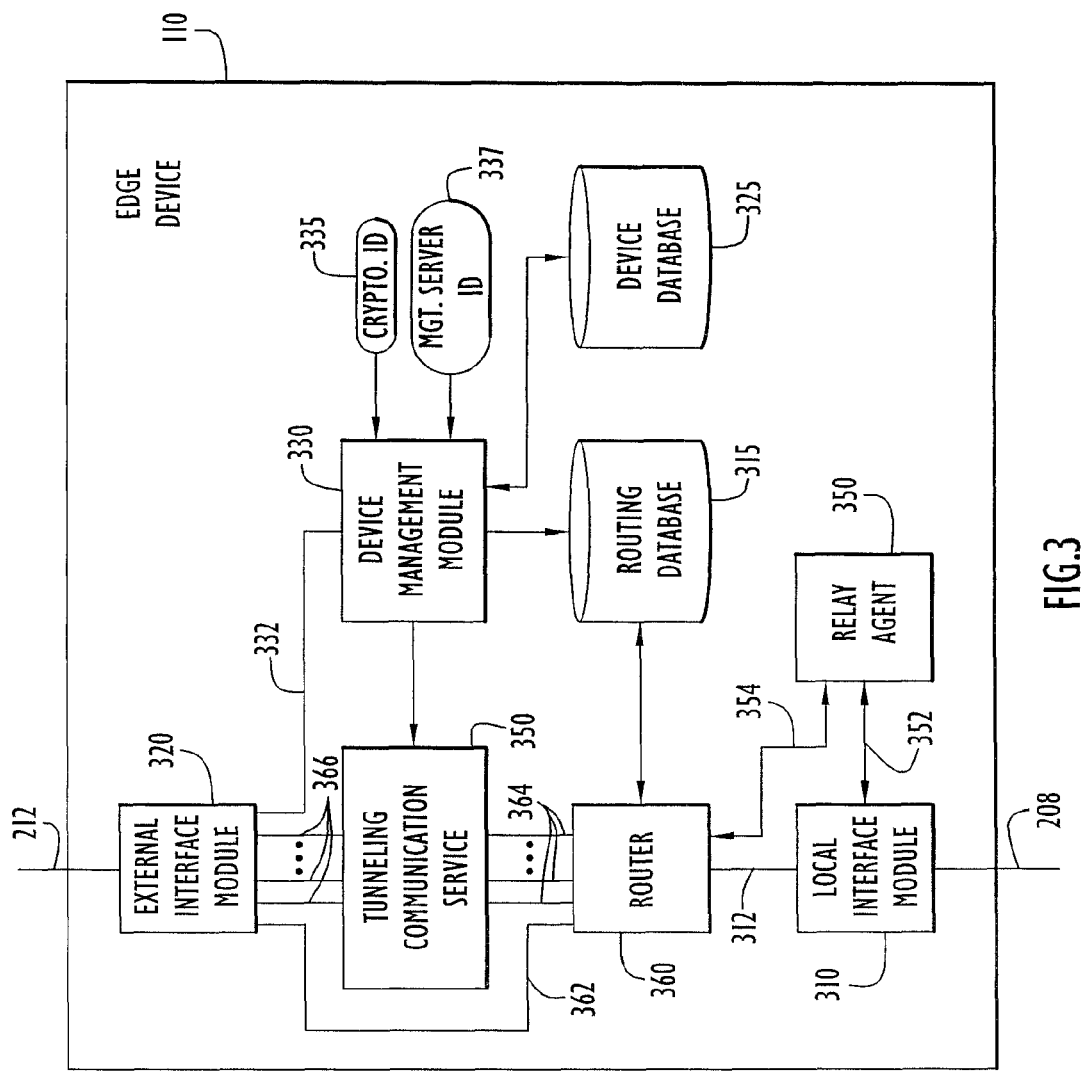
FIG. 3 is a logical block diagram of an edge device.

Turning to FIG. 3, edge device 110 includes a number of logical modules. A local interface module 310 provides a physical and data-link layer (ISO layers 1 and 2) communication interface with computers 120 (FIG. 2) coupled to the edge device through local are network (LAN) link 208 over subnetwork 125 (FIG. 1). Local interface module 310 accepts and provides IP packets over an internal data path 312 and interfaces with LAN link 208, for example, a 10Base-T Ethernet connection. An external interface module 320 accepts and provides IP packets over data paths from and to a number of other modules in the edge device, and provides physical and data-link layer interfaces to communication link 212, for instance, using another 10Base-T Ethernet connection, which couples the edge device to communication interface 214 (FIG. 2).

Central to operation of edge device 110 is device management module 330. Device management module 330 is coupled over a data path 332 to external interface module 320, over which it connects to Internet 100 through POP 220 (FIG. 2) and then establishes a communication session with management server 130 (FIG. 1). Edge device 110 includes a stored management server identification 337, such as an Internet host name or IP address, which management module 330 uses in establishing the communication session with the management server. As is discussed fully below, device management module 330 makes use of a cryptographic identification 335 to authenticate management server 130 (FIG. 1), to provide the information needed by management server 130 to authenticate it, and to pass encrypted information back and forth with the management server according to a secure communication protocol. Device management module 330 securely communicates with management server 130 for purposes including obtaining a current version of the device configuration, peer configuration, VPN security policy, peer connectivity, and peer security association information.

Edge device 110 includes a router 360 and a tunneling communication service 350, which are coupled between local interface module 310 and external interface module 360. Tunneling communication service 350, at the direction of device management module 330, establishes and maintains communication with other edge devices 110 to provide IPSec based communication between router 360 and corresponding router 360 in other edge devices 110.

Router 360 accepts IP packet from a number of data paths within edge device 110 and routes those packets to selected others of those data paths. In one instance, router 360 accepts IP packets over data path 312 from local interface module 310. Based on information stored in a routing database 315, the type of the packet, and the destination address in the packet, router 360 determines whether the accepted packet should be routed over a data path 364 through one of the tunnels maintained by tunneling communication service 350, should be routed directly to the Internet through external interface module 320 over data path 362, or should be processed in some other way, for example if the packet includes routing information.

In another instance, router 360 accepts IP packets from tunneling communication service 350. Based on routing database 315, router 360 determines whether an accepted packet is addressed to a computer 120 on subnetwork 125 coupled to the edge device and therefore should be passed over data path 312 to local interface module 310, should be passed back to tunneling communication service 350 to be forwarded over a tunnel to another edge device, or should be processed in some other way.

Router 360 exchanges routing information with routers 360 at other edge devices 110 over tunnels 115. In this embodiment the exchange of routing information is according to a standard dynamic routing protocol, such as the Routing Information Protocol version 2 (RIPv2) or the Open Shortest Path First (OSPF) Protocol. Router 360 uses this exchanged routing information to maintain routing database 315. In this way, the basis for routing decisions made by router 360 is dynamically updated, and router 360 can react to changes in the configuration of remote networks behind edge devices or the state of tunnels 115 (FIG. 1) coupling the edge devices. In addition to or as an alternative to this type of dynamic routing, device management module 330 can receive routing information from management server 130 to update routing database 315.

Edge device 110 includes a relay agent 350, which forwards certain classes of IP packets that are not specifically addressed to other computers. In one relay mode, relay agent 350 accepts BOOTP IP packets, which are broadcast by computers 120 over local subnetwork 125 to obtain startup configuration data and received by local interface module 310, and sends IP packets containing the information in the accepted broadcast packets to the relay agents in other edge devices or to a particular computer that can service the request in the broadcast packet. In this way, in the case of the BOOTP packets, a computer 120 can obtain configuration information, such as its IP address and host name, from a BOOTP server that is on the VPN but located on a different subnetwork, even though such a packet would not normally have been routed to that other network by router 360.

Figure 4:
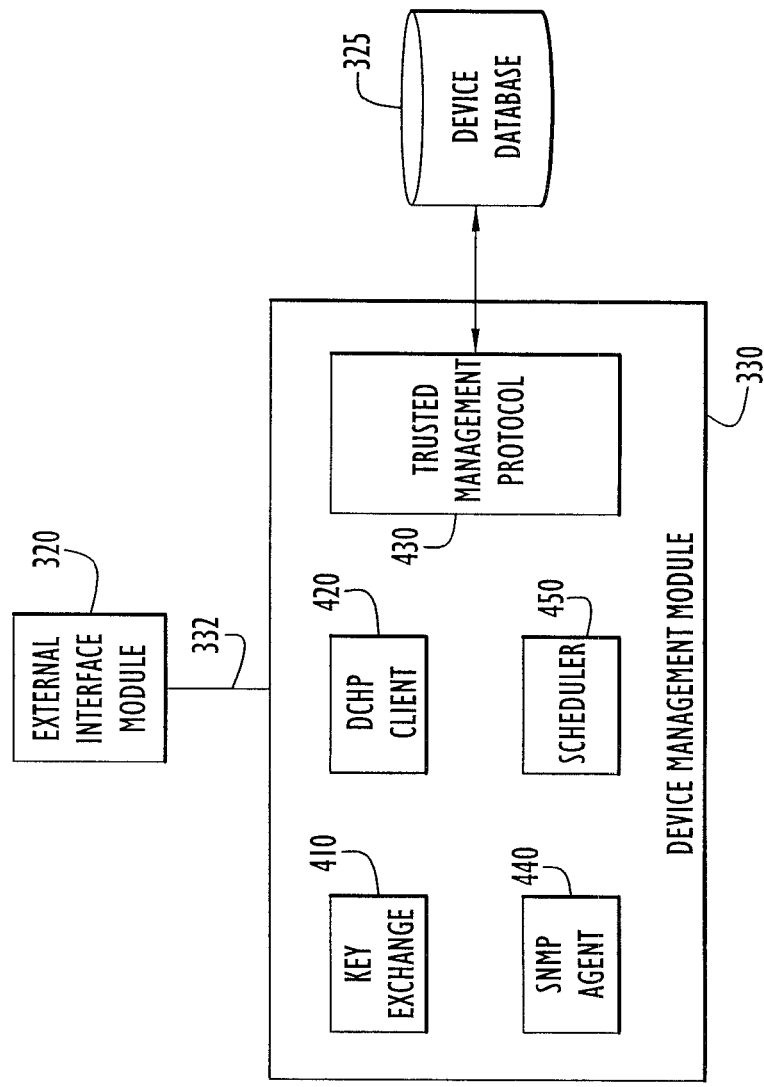
FIG. 4 is a logical block diagram of a device management module.

Referring to FIG. 4, device management module 330 includes several logical components.

A key exchange module 410 is used to exchange cryptographic keys with other computers or devices on Internet 100 in order to establish secure tunnels with those computers or devices.

The DHCP client 420 implements the dynamic host configuration protocol (DCHP), which is a standard protocol for the dynamic and automatic assignment of Internet Protocol (IP) addresses to end systems, such as personal computers, etc. which are connected to IP-based network. In this embodiment, device management module 330 uses DCHP client 420 to obtain an external IP address for edge device 110. This address is associated with external interface module 320, and is used by other devices on the Internet to address IP packets, such as packets that encapsulate traffic in tunnels 115, to the edge device.

The SNMP agent 440 implements the Standard Network Management Protocol (SNMP). SNMP agent 440 provides monitored information to other network management computers. The requests for monitored information may come over one of the established tunnels, over a designated secure network management tunnel, of from the local subnetwork.

A scheduler 450 coordinates execution of processes and task of the various modules of the edge device to ensure real-time operation. Scheduler 450 is implemented as a state machine, and is responsible, for example, for initiating rollover of session keys and triggering protocol timeouts.

A trusted management protocol module 450 is used to accept data from management server 130, which it then stores in device database 325. Trusted management protocol 450 insures the integrity of this data as it is transmitted between an edge device 110 and management server 325. Data transferred using this protocol is first encrypted with a unique symmetric key, which is itself then encrypted with a public key corresponding to a private key held by the recipient. This whole message is signed using the private key of the sender. An anti-replay mechanism is also incorporated into the protocol. This mechanism includes repeatedly exchanging challenges and corresponding responses between the edge device and the management server.

In use, an edge device 110 goes through several stages including manufacture-time configuration, initial configuration and startup at a customer premises, restarting at a customer premises after a period of disconnection from the Internet, and normal operation while connected to the Internet.

During the manufacturing stage, information is stored in edge device 110 to allow it to be configured as automatically as possible when initially started up at a customer premises. An important aspect of the manufacturing stage is to store cryptographic identification 335 (FIG. 3) in edge device 110.

Before use, typically after the manufacturing stage, a management server identification 337 (FIG. 3), for instance, a network address for accessing the server or a unique identifier used in cryptographic certificates for the server, is provided to the edge device.

Figure 5A:
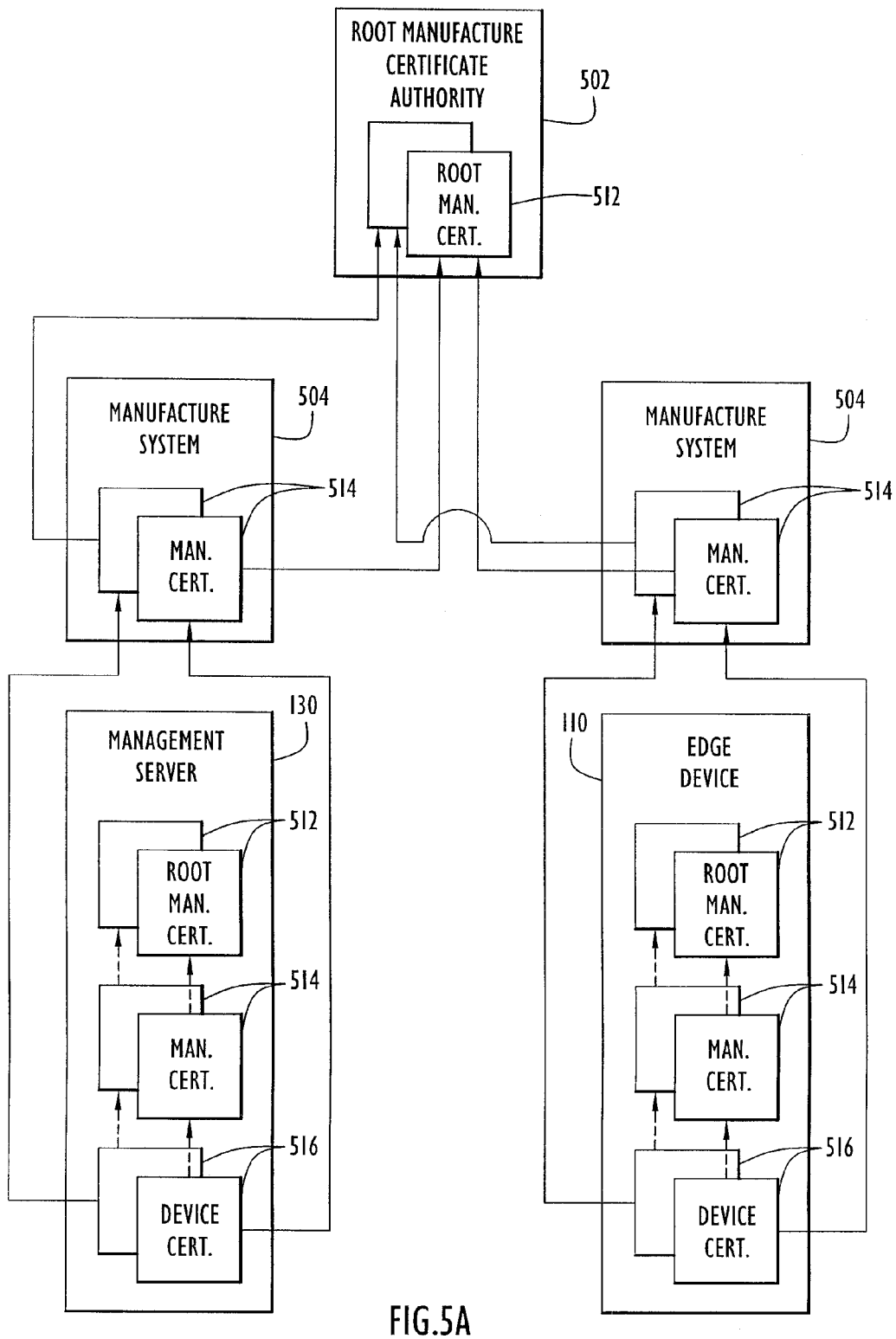
FIGS. 5A-C relate to configuration of cryptographic information.
Figure 5B:
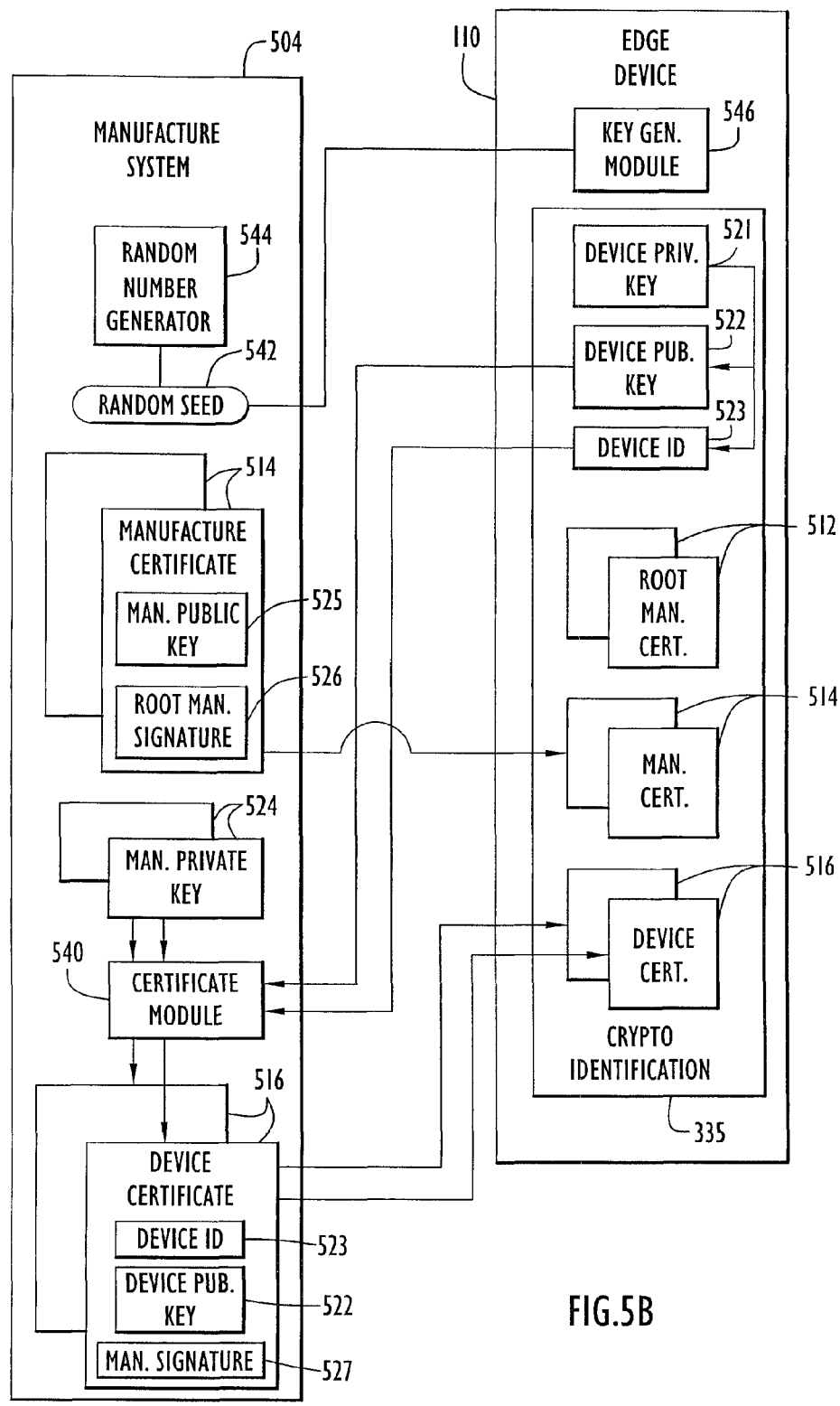
Figure 5C:
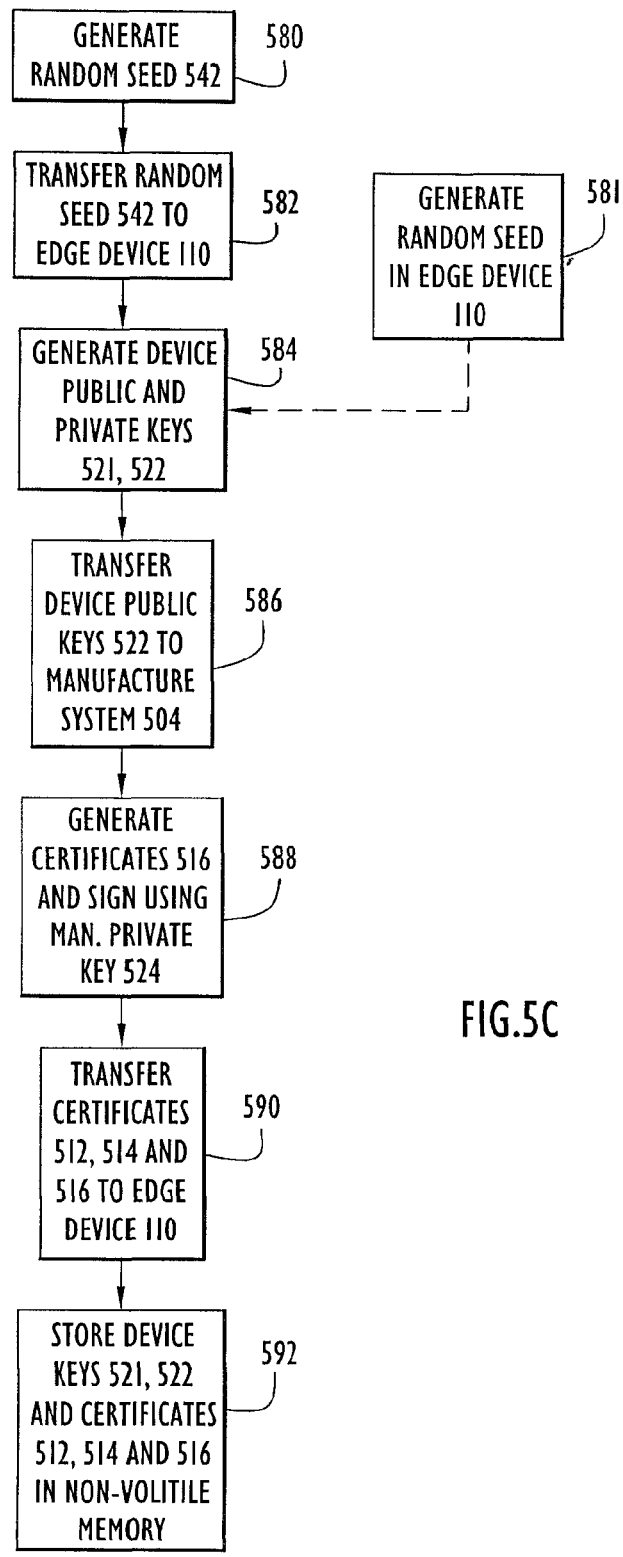

FIGS. 5A-C relate to configuration of cryptographic information in edge devices 110. FIG. 5A shows an interrelationship of certificates in a deployed system. FIG. 5B illustrates the interaction of a manufacturing system 504 and an edge device 110 during manufacture-time configuration, and FIG. 5C is a flowchart of that configuration.

Referring to FIG. 5A, each edge device 110, as well as management server 130 include certificates that are used to mutually authenticate one another. The certificates are arranged in two separate chains. A root manufacturing certificate authority 502 has two pairs of public/private keys, in this embodiment 1024 bit RSA keys. Two root manufacturing certificates 512 include these public keys, and are optionally signed by another global certificate authority. In this embodiment, certificates 512 conforms to the X.509v3 standard.

Configuration of edge devices 110 and management server 130 is carried out by a number of manufacture systems 504. Each manufacturing system 504 has two pairs of public/private keys, and has corresponding manufacturer certificates 514, each of which includes one of the manufacturer public keys and is signed using a different one of the root manufacture private keys. A particular manufacture system 504 can periodically generate a new pair of public/private keys and create new manufacturer certificates 514 signed by the root manufacture certificate authority.

Each edge device 110, as well as optionally management server 130, has copies of root manufacturer certificates 512, or at least the public keys of the root manufacturing certificate authority, as well as a copy of manufacturer certificates 514 of the manufacture system 504 used to configure its identity.

Finally each edge device has a pair of public/private key pairs, and two corresponding device certificates which include a device public key and which are signed with the corresponding manufacturer private keys of the manufacture system 504 use to configure the device.

Referring now to FIGS. 5B-C, in operation, an edge device 110 exchanges one of the device certificates 516, and the corresponding one of its two manufacturer certificates 514 with management server 130. Using the root manufacturer public key in the corresponding one of the two root manufacturer certificates 512, management server 130 first validates the signature of the manufacturer certificate 514 it received from the edge device, and then uses the manufacturer public key in that manufacturer certificate to validate the device certificate 516 it received from the edge device. In this way, management server 130 knows that it holds a valid device public key for the edge device. Using a corresponding sequence, edge device 110 validates a management server public key for the management server. In this way, the edge device and the management server mutually authenticate one another, and then they use their peer devices' public keys to securely exchange information. The two chains of certificates 512, 514, and 516 are redundant in that if one of the public keys of the root manufacture private keys is compromised, the certificates in that chain can be retired and no longer used, or optionally, the certificates in the remaining chain can be used to securely distribute a new set of certificates.

Referring still to FIGS. 5B-C, each edge device 110 is configured at manufacturing time through an interaction with a manufacture system 504. In the following description, the referenced steps are illustrated in the flowchart shown in FIG. 5C while the processing and data modules are shown in FIG. 5B. First, root manufacturer system 504 generates a random seed 542 using a random number generator 544 (step 580). Manufacturer system 504 transfers this random seed to edge device 110 (step 582). Alternatively, edge device 110 internally generates random seed 542 (step 581), thereby reducing the possibility of compromising the device private key. Edge device 110 then generates device public key 522 and corresponding device private key 521 using a key generation module 546 (step 584). In this embodiment, key generation module 546 creates a 1024 bit public/private RSA key pair. Edge device 110 then passes device public key 522 back to manufacture system 504 (step 586), but retains device private key 521 within the edge device. Device private key 522 is preferably never disclosed outside edge device 110, thereby assuring that the edge device is the only device that can decrypt information encrypted with device public key 522, and ensuring that data signed with device private key 521 can be trusted by other devices to have originated at that edge device 110. Manufacturer system 504 then generates two device certificates 516 using a certificate module 540. Certificate module 540 creates each device certificate 516 such that it contains device public key 522 and is signed using the corresponding manufacture private key 524 (step 588). In this way, a device that receives a device certificate 516 and the corresponding manufacturer certificate 514 and that has a trusted copy root manufacture certificate 512 (or equivalently a copy of the root public key) can validate device public key 522 and trust the authenticity of that device public key. In this embodiment, certificates 512, 514, and 516 all conform to the X.509v3 standard. Manufacturer system 504 then transfers device certificates 516, its own manufacturer certificates 514, and root manufacture certificates 512 (or at least the root manufacturer public keys to edge device 110 (step 590). Edge device 110 then stores the entire cryptographic identification 335, which includes device public and private keys 521, 522, root manufacture certificates 512, manufacturer certificates 514, and device certificates 516, in non-volatile memory.

In other related embodiments, edge device 110 keeps secret its device private key 521. In one alternative, rather than storing a copy of certificates 512, 514, and 516, the certificates are stored elsewhere, such as in a central database. Since device certificates 516 can be validated by a holder of certificates 514 and 512 a recipient of the device certificate can determine the authenticity of the device public key in the certificate using a trusted copy of root public key 520.

In other alternative embodiments, other approaches to chaining certificates are used. For example, all certificates can be signed by a common certificate authority, or different length chains of certificates can be used.

After edge device 110 is delivered to a customer premises, and initial configuration and startup is carried out. In a fully automated startup mode, edge device 110 is connected to communication device 214 (FIG. 2) and communication device 214 is connected to a communication link 216 to an Internet POP 220. Edge device 110 is also connected to local subnetwork 125. At the initial startup, edge device 110, using DCHP client 420 in management module 330, obtains an external IP address for communicating with other devices on the Internet from a DCHP server at POP 220. The local IP address on subnetwork 125 of edge device 110 is either determined by a configuration at the customer premises, or is determined from management server 130.

A variety of alternative startup scenarios are also supported by edge device 110. For instance, local and external IP addresses may be statically assigned to edge device 110 and manually entered before the initial startup.

Once edge device 110 has obtained an external IP address and can communicate with other devices on the Internet, it attempts to establish secure and authenticated communication with management server 130 using trusted management protocol 430. This process includes transferring a certificate chain, which includes one of certificates 516 and a corresponding one of manufacturer certificates 514, from edge device 110 to management server 130. Since management server 130 has a copy of root manufacture certificate 512, or equivalently a copy of the root public key, it can authenticate certificate 516, thereby obtaining an authenticated device public key 522 in the certificate. It then authenticates edge device 110 using device public key 522 and a signature with device private key 521 of a message sent from edge device 110. Edge device 110 holds a trusted copy of root manufacturer certificate 512, or equivalently a trusted copy of the root public key, which it received at the time of manufacture, and can authenticate management server 130 using the root manufacturer public key using the same procedure used by management server 130 to authenticate edge device 110.

In alternative embodiments, further authentication of a user is required before edge device 110 is allowed to enter the VPN. For example a user at edge device 110 may be required to provide a username and password. This username and password are authenticated by management server 130, possibly using the services of an authentication server, such as a RADIUS server, which centrally holds authentication data for the organization managing the VPN.

Once edge device 110 is in communication with management server 130, it receives additional configuration information, such as information related to routing and security policies from the management server.

When management server 130 detects the presence of an edge device 110, it determines to which other edge devices 110 it should establish tunnels 115. For instance, management server 130 includes a central database containing information about the VPN, such as which edge devices 110 should be directly coupled by tunnels 115 and which edge devices 110 should route data from one tunnel 115 to another.

In order to have a tunnel 115 established between two edge devices 110, management server sends commands to each of the edge devices 110 instructing them to add the tunnel. Management server 130 generates session keys that it securely transfers to the edge devices for use to encrypt and decrypt data passing through the tunnel joining the edge devices.

Alternatively, management server 130 can let the edge devices determine the session keys themselves using standard key exchange approaches, while still providing data, such as device public keys, which the edge devices use to authenticate each other. In one alternative embodiment, management server 130 instructs an edge device 110 to establish a tunnel with another device that is not managed by management server 130. In this case, edge device 110 and the other device authenticate one another using a protocol such as IKE, and may rely on certificates signed by a common certificate authority.

Once the edge devices have been commanded to create a tunnel, and have generated or received from the management server the needed cryptographic keys, the edge devices complete creation of the tunnel joining them, and are able to securely pass data between them. The edge devices update their routing databases, for example by passing routing information over the newly created tunnel, or by receiving routing data from the management server.

When a edge device is removed from the VPN, the management server commands its peer edge devices to shut down the tunnels linked to it.

Optionally, when an edge device 110 is restarted after having been previously connected to the VPN, it relies on configuration data stored in its non-volatile memory to simplify the startup procedure. For example, management server 130 does not have to transfer configuration data that is unchanged from that it previously transferred to the edge device.

Edge device 110 can be implemented in a variety of ways. In one embodiment, the modules shown in FIG. 3 are code and data modules that control execution of a general purpose processor in edge device 110. In alternative embodiments, a special-purpose processor or other hardware accelerators are used to perform some of the functions. When edge device 110 is wholly or partially software based, the edge device includes a program storage, such as a magnetic disk or non-volatile semiconductor storage, for holding the software. Optionally, management server 130 can securely transfer software updates to the edge device to alter its behavior, for example to fix bugs, add functionality, or the track changing communication protocols.

Figure 6B:
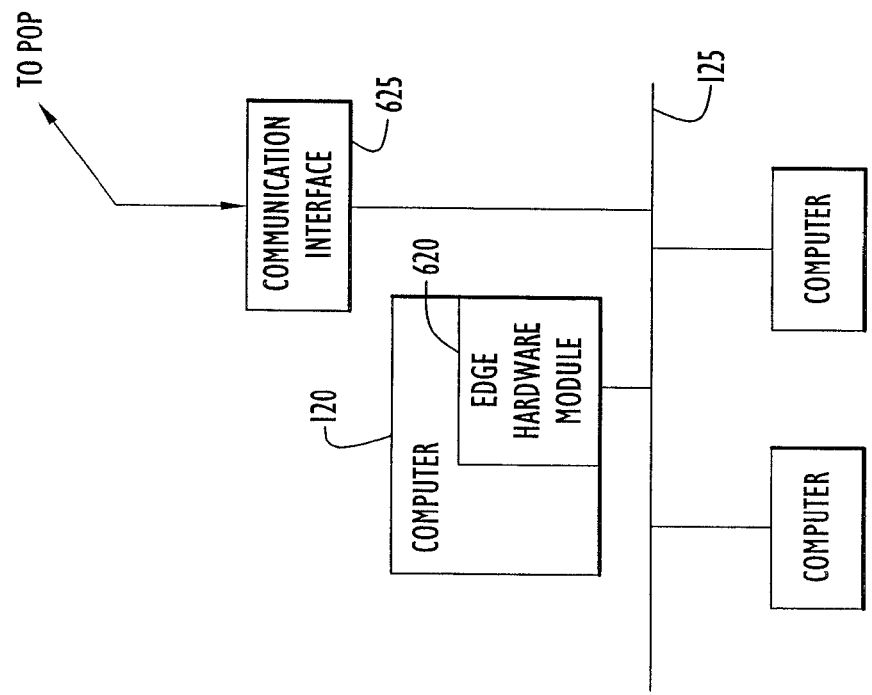
FIGS. 6A-B are block diagrams of alternative embodiments of an edge device.
Figure 6A:
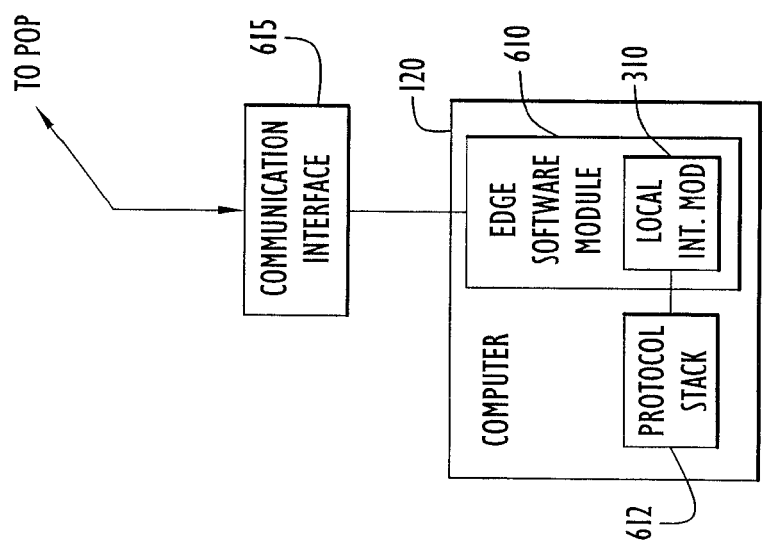

Referring to FIGS. 6A and 6B, alternative embodiments of edge device 110 do not necessarily use a separate hardware device to implement similar functionality. Referring to FIG. 6A, a software-based edge software module 610 implements similar functionality as the modules shown in FIG. 3. In the alternative embodiment shown in FIG. 6A, local interface module 310 interfaces with an IP layer of a software protocol stack 612 executing on computer 120. External interface module 320 interfaces with a physical communication link coupled to the computer, for example, a 10Base-T Ethernet link or a serial RS-232 link. Communication interface 615 then provides an interface between the computer and the ISP POP. For example, communication interface 615 can be a cable modem coupled to the ISP over a cable television network.

Referring to FIG. 6B, in another alternative embodiment, the functionality of edge device 110 is implemented on a coprocessor board as an edge hardware module 620 that is hosted in a computer 120. In FIG. 6B, edge hardware module 620 has only a single connection to local subnetwork 125. Communication between another computer 120 and an edge device 110 at another location on the Internet passes from that computer, to edge hardware module 620, and then back over local subnetwork 125 to communication interface 625. Communication interface 625 may be a standard device such as a router or a firewall device that is used to couple subnetwork 125 to the Internet.

Referring back to FIG. 2, another alternative embodiment combines the functionality of edge device 110 and communication interface 214 into a single device 205. An example of such a single device might accept a 10Base-T connection from a computer, and connect directly to a cable television network, providing both the functionality of the edge device and a cable modem in a single device.

Figure 7:
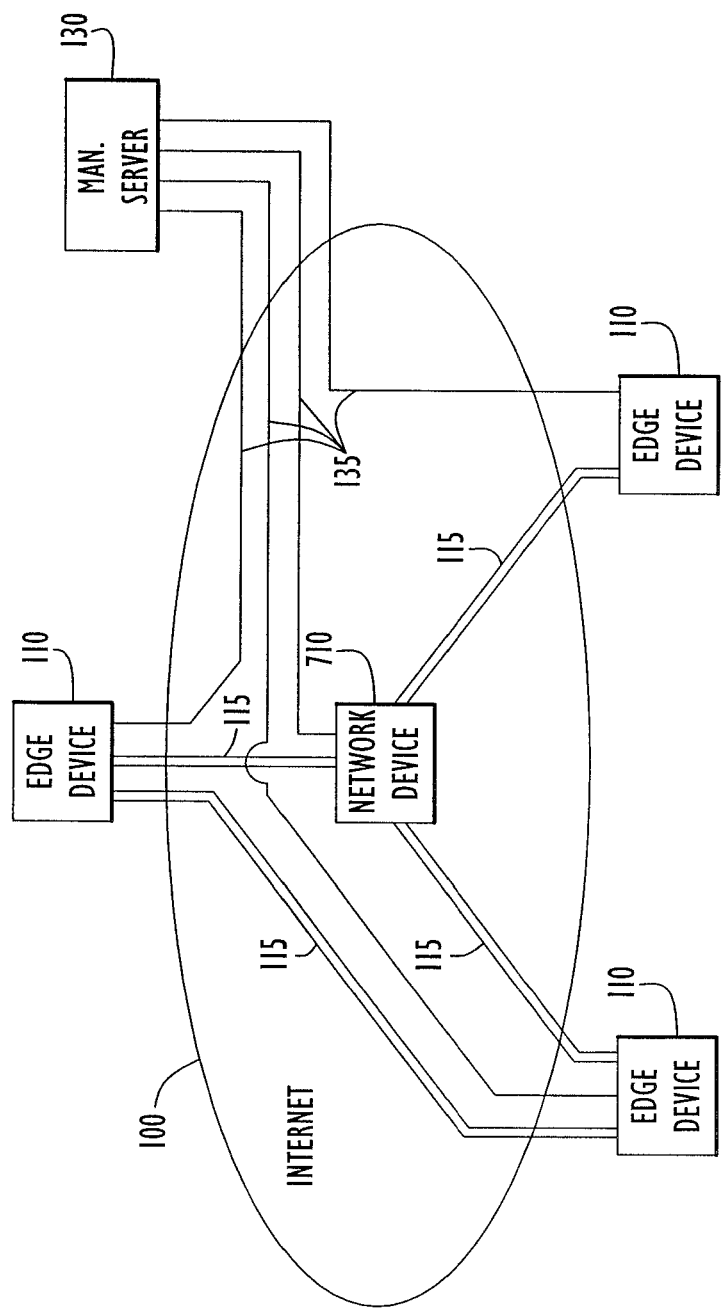
FIG. 7 is a block diagram which illustrates a VPN which uses a network device to route data over the Internet.

Referring to FIG. 7, a network device 710 is used in conjunction with edge devices 110 of the type described above to provide connectivity through tunnels 115 to form the VPN. Network device 710 is similar to edge device 110, as shown in FIG. 3, although it does not necessarily have a local interface module 310. Instead, it simply routes traffic between tunnels 115 that are connected to it without necessarily servicing a local subnetwork. One or more network devices 710 can be used to reduce the number of tunnels that are needed as compared to a fully meshed VPN. Also, network device 710 can provide redundant tunnels 115 that may be dynamically chosen by routers 360 (FIG. 3) depending on routing data related to the different tunnels.

Figure 8:
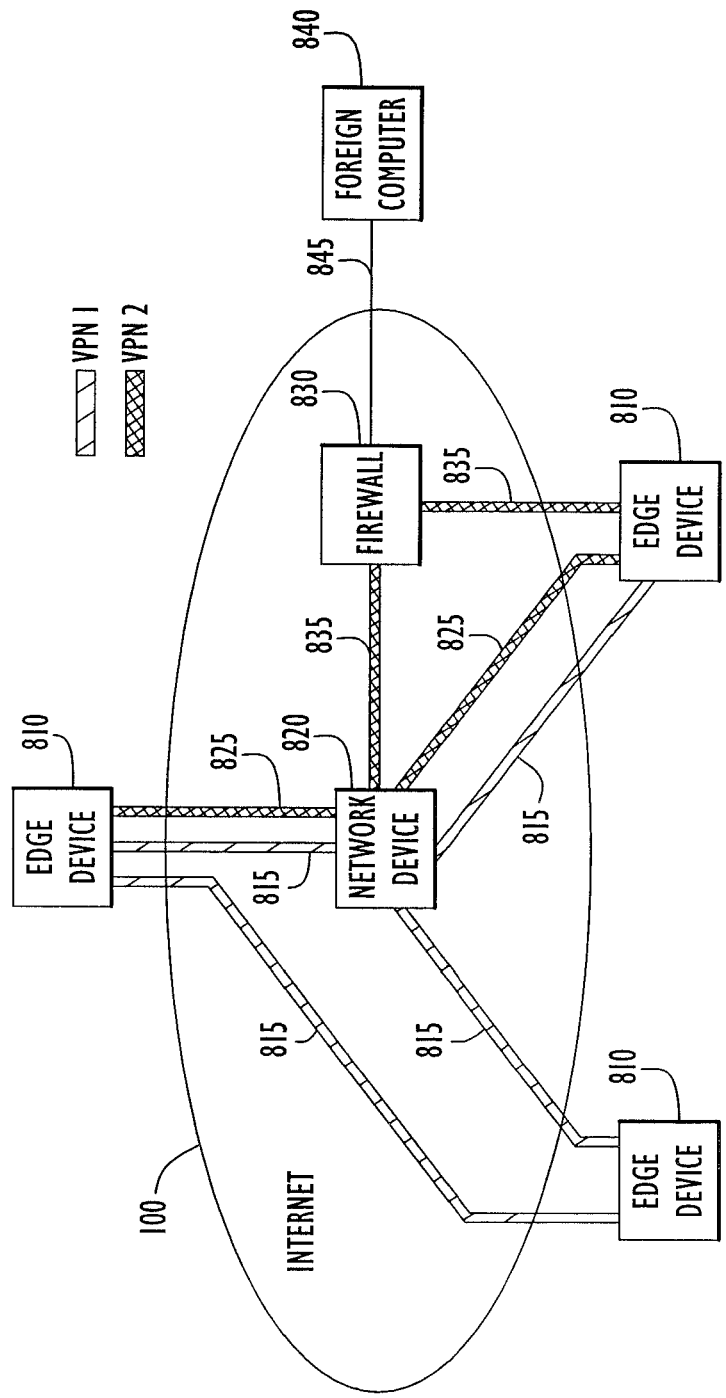
FIG. 8 is a block diagram which illustrates multiple segregated VPNs supported using common edge and network devices, and illustrates a centralized firewall server coupled to a VPN.

In yet another embodiment, edge devices 110 and network devices 710 can concurrently implement multiple segregated VPNs. The VPNs are segregated in that a router 360 does not pass packets between the different segregated VPNs. Referring to FIG. 8, three edge devices 810, which are similar to edge devices 110 but with the ability to handle multiple VPNs, and a network device 820, which is similar to network device 710 (FIG. 7), form two VPNs. Tunnels 815 are used in a first VPN, while tunnels 825 are used in a second VPN. Network device 820 and edge devices 810 do not route data or pass routing information from a tunnel 815 to a tunnel 825, thereby maintaining the segregation. In this arrangement, network devices 710 can optionally be used to establish a management VPN that is used to manage the network devices themselves, separate from the VPNs set up for particular customers.

Referring still to FIG. 8, a centralized firewall 830 provides restricted access for computers 840 over Internet 100 to a VPN. Centralized firewall 830 maintains tunnels 835 to one or more edge devices 810 or network devices 820, and is centrally managed from a management server 130 (not shown in FIG. 8). In this way, a high capacity firewall computer can be used rather than hosting a firewall at a customer premises. In alternative embodiments of a centralized firewall 830, restricted access can be concurrently provided to a number of VPNs.

In other embodiments, other shared resources can be centralized and accessed over one or more VPNs, including for example, communication gateway servers or data servers with restricted access.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method of configuring and authenticating a node device, the method comprising:
   at a manufacturing facility, generating a public key and a private key in the node device;
   storing the private key by the node device in a protected non-volatile storage;
   providing the public key to the manufacturing facility, by the node device;
   generating a public key certificate that includes the node device's public key and is signed with a private key associated with the manufacturing facility, by the manufacturing facility;
   providing the public key certificate to the node device, by the manufacturing facility;
   storing the public key certificate in nonvolatile storage, by the node device;
   providing an authentication chain, including a first plurality of public key certificates, to the node device for authenticating the certificates of other node devices, by the manufacturing facility;
   storing the authentication chain, including the first plurality of public key certificates, in the nonvolatile storage, by the node device;
   deploying the node device;
   the node device authenticating itself to other node devices and servers by using said private key to sign messages and sending the signed messages and the public key certificate to the other node devices or servers, said other node devices or servers then authenticating the public key certificate using a second authentication chain, including a second plurality of public key certificates, stored on the other node devices or servers and confirming the messages were signed using the private key corresponding to the public key in the public key certificate; and
   additional node devices and servers authenticating to the node device by using private keys of the additional node devices and servers to sign messages and sending signed messages and the public key certificates to the node device, the node device then authenticating the public key certificates using the authentication chain, including the first plurality of public key certificates of the node device and confirming that, for each additional node device or server, the messages were signed using the private key corresponding to the public key in the public key certificate.

* * * * *

UNITED STATES PATENT AND TRADEMARK OFFICE
CERTIFICATE OF CORRECTION

| | | |
|---|---|---|
| PATENT NO. | : 8,520,670 B1 | Page 1 of 2 |
| APPLICATION NO. | : 12/206263 | |
| DATED | : August 27, 2013 | |
| INVENTOR(S) | : Giniger et al. | |

It is certified that error appears in the above-identified patent and that said Letters Patent is hereby corrected as shown below:

On the Title page, in the Figure, in Step "592", in Line 5, delete "NON-VOLITILE" and insert -- NON-VOLATILE --, therefor.

In the Drawings

In Figure 4, Sheet 4 of 12, for Tag "420", in Line 1, delete "DCHP" and insert -- DHCP --, therefor.

In Figure 5C, Sheet 7 of 12, in Step "592", in Line 5, delete "NON-VOLITILE" and insert -- NON-VOLATILE --, therefor.

In the Specification

Column 3, Line 11, delete "DCHP" and insert -- DHCP --, therefor.

Column 3, Line 19, delete "DCHP" and insert -- DHCP --, therefor.

Column 3, Line 21, delete "DCHP" and insert -- DHCP --, therefor.

Column 3, Line 23, delete "DCHP" and insert -- DHCP --, therefor.

Column 8, Line 1, delete "edge device 125" and insert -- edge device 110 --, therefor.

Column 8, Line 60, delete "edge device 115" and insert -- edge device 110 --, therefor.

Column 8, Lines 64-65, delete "edge device 115" and insert -- edge device 110 --, therefor.

Column 8, Line 65, delete "edge devices 115" and insert -- edge devices 110 --, therefor.

Signed and Sealed this
Twenty-sixth Day of August, 2014

Michelle K. Lee
*Deputy Director of the United States Patent and Trademark Office*

CERTIFICATE OF CORRECTION (continued)
U.S. Pat. No. 8,520,670 B1

Column 9, Line 4, delete "edge device 115" and insert -- edge device 110 --, therefor.

Column 9, Line 9, delete "DCHP" and insert -- DHCP --, therefor.

Column 9, Lines 23-24, delete "edge devices 115" and insert -- edge devices 110 --, therefor.

Column 9, Lines 26-27, delete "edge device 115" and insert -- edge device 110 --, therefor.

Column 9, Line 37, delete "premises 220" and insert -- premises 200 --, therefor.

Column 9, Line 48, delete "110." and insert -- 100. --, therefor.

Column 10, Line 25, delete "local are" and insert -- local area --, therefor.

Column 10, Line 58, delete "360." and insert -- 320. --, therefor.

Column 11, Line 56, delete "(DCHP)," and insert -- (DHCP), --, therefor.

Column 11, Line 60, delete "DCHP" and insert -- DHCP --, therefor.

Column 12, Line 10, delete "450" and insert -- 430 --, therefor.

Column 12, Line 12, delete "450" and insert -- 430 --, therefor.

Column 12, Line 14, delete "325." and insert -- 130. --, therefor.

Column 13, Line 45, delete "522" and insert -- 521 --, therefor.

Column 14, Line 18, delete "device" and insert -- interface --, therefor.

Column 14, Line 19, delete "device" and insert -- interface --, therefor.

Column 14, Line 22, delete "DCHP" and insert -- DHCP --, therefor.

Column 14, Line 24, delete "DCHP" and insert -- DHCP --, therefor.

In the Claims

Column 17, Line 30, in Claim 1, delete "nonvolatile" and insert -- non-volatile --, therefor.

Column 18, Line 6, in Claim 1, delete "nonvolatile" and insert -- non-volatile --, therefor.